United States Patent [19]
Caruso et al.

[11] 3,849,637
[45] Nov. 19, 1974

[54] REACTOR MEGAWATT DEMAND SETTER

[75] Inventors: Robert M. Caruso, Simsbury;
Charles R. Musick, Vernon, both of Conn.

[73] Assignee: Combustion Engineering, Inc.,
Windsor, Conn.

[22] Filed: May 22, 1973

[21] Appl. No.: 362,786

[52] U.S. Cl. ......... 235/151, 235/151.21, 176/20 R, 176/60
[51] Int. Cl. ......................... G21d 3/00, G06f 7/54
[58] Field of Search ...... 235/151, 151.21, 184, 185; 176/20 R, 60; 307/52, 57, 60

[56] References Cited
UNITED STATES PATENTS

| | | | |
|---|---|---|---|
| 3,539,785 | 11/1970 | Baker | 235/151.21 |
| 3,588,265 | 6/1971 | Berry | 415/1 |
| 3,629,562 | 12/1971 | Davis et al. | 235/151.21 |
| 3,630,839 | 12/1971 | Podolsky | 176/20 X |

*Primary Examiner*—Malcolm A. Morrison
*Assistant Examiner*—Edward J. Wise

[57] ABSTRACT

The electrical power output of a nuclear powered generating station, as requested by an operator or by an automatic dispatch system for the grid with which the station is associated, is controlled in a manner which insures that the nuclear steam supply system limits are not violated. The invention permits the nuclear powered generating unit to operate at maximum permissible power for the existing nuclear steam supply system conditions by exercising control over the unit turbine in such a manner that the rate of load change will be controlled as a function of the proximity of the actual load to the desired load and the rate of load increase will be algebraically limited by the proximity of the nuclear steam supply system conditions to the steam supply system operating limits. Additionally the turbine load will automatically be reduced when necessary at a rate which equals or exceeds a value which is commensurate with the magnitude of any violation of the steam supply system operating limits.

10 Claims, 5 Drawing Figures

REACTOR MEGAWATT DEMAND SETTER

BACKGROUND OF THE INVENTION

1. Field of the Invention

The present invention relates to control systems for nuclear powered generating units. More specifically, this invention is directed to the automatic control of the output power provided by a nuclear powered electrical generating unit in such a manner that load demands imposed on the unit will not result in violation of the nuclear steam supply system operating limits. Accordingly, the general objects of the present invention are to provide novel and improved apparatus and methods of such character.

2. Description of the Prior Art

In the manner well known in the art, the generator units operated by an electric utility will be interconnected in a load supplying grid with the individual units all being controllable from a main supervisory control. The main control will typically be computer based. Such power grid controls are known in the art as automatic load dispatch systems. Such systems monitor the power being provided by all generating units within the grid, monitor the power capability of each unit and also monitor grid frequency deviation from a 60 cps reference. The automatic dispatch system, based upon the aforementioned information and a stored program which takes each units efficiency into account, computes the most economical manner in which the grid load may be shared in order to maintain grid frequency at 60 cps. Briefly, the automatic dispatch system generates and transmits to the individual generating units load increase and decrease signals indicative of load changes necessary to maintain the desired average grid frequency.

It has been known in the art to deliver the load demand signals from the automatic dispatch system to the control for the turbine or turbines which form a part of the power generating station unit. In the case of a nuclear powered generating station, since the reactor is inherently load following, the control of unit electrical power output by means of exercising control over the turbine will simultaneously affect the nuclear steam supply system. As is well known in the art, the instantaneous limits of a number of core operating parameters must not be violated if safe reactor operation is to be maintained and automatic reactor shutdowns are to be avoided. Systems are available in the prior art for measuring critical reactor operating parameters and for calculating the proximity of the monitored parameters to their operating limits, which limits are set with a substantial margin of safety, for the instantaneously existing core conditions. Thus, as was the case with fossil fueled power generating station development, the need for improved power maneuvering capability within a grid without penalizing plant availability or compromising safety has led to the introduction of sophisticated systems for the protection, control and supervision of nuclear powered generating stations. The availability of sophisticated reactor control systems notwithstanding, it has been conventional practice to automatically switch load control to manual at the turbine in the event that a nuclear steam supply system limit is reached. An alternative prior art practice has been to automatically command a substantial turbine load setback whenever the violation of a steam supply system limit has been predicted or actually sensed and then to switch load control to manual at the turbine.

Thus, in general, in the prior art the interface between the individual operator and the means of controlling the load on a nuclear powered generating unit has consisted of the controls for the turbine per se. These controls have allowed the operator to monitor turbine status and select either a unit or automatic dispatch system control mode; the unit mode of control being assumed in the case of nuclear steam supply system limit violation. Some prior art controls have also included means for commanding turbine load runbacks or set-backs in response to the sensing of abnormal nuclear steam supply system or turbine conditions. While this manner of control provides a mechanism for reducing load based on the nuclear steam supply system conditions, any such load reduction necessarily curtails automatic dispatch system control and leaves the generator unit operating at a power which may be substantially below that which it is capable of providing. For these reasons turbine load run-back and setback initiations have been reserved for abnormal conditions where power availability and curtailment of automatic dispatch system control was not a consideration. This approach to control is both inflexible and inefficient.

Summary of the Invention

The present invention overcomes the above briefly discussed and other disadvantages of the prior art by providing for the control of the load on a nuclear powered electric generation unit in accordance with the demand established by a load dispatching center while simultaneously insuring that the nuclear steam supply system operating limits are not violated. In accomplishing these general objectives, the present invention neither unnecessarily limits the megawatt output of the generator unit nor unnecessarily curtails the automatic dispatch system control.

The present invention consists of a megawatt demand setter which receives inputs from the automatic load dispatch system, from the generator unit operator's manual load setting device and from the nuclear steam supply system operating limit supervisory system. In response to these inputs the invention screens load increase demands, whether manually or automatically generated, to insure that the nuclear steam supply system operating limits are not violated. A particularly novel feature of the present invention is the ability to reduce the rate of load increase or decrease, as the margin between actual and desired load is consumed during a load change maneuver, until zero margin exists. A further novel feature is the ability to algebraically reduce the rate of load increase, as the margin between actual and permissible load for the nuclear steam supply system condition is consumed, until zero margin exists. Thus, in accordance with the present invention, control is exercised over the turbine of a nuclear powered electrical generation unit in such a manner that, at the zero margin condition, the rate of increase or decrease of the megawatt load will also be zero. Additionally, should the nuclear steam supply system operating margins for any reason become negative, the present invention will cause turbine load to be decreased at a rate which equals or exceeds a rate which is proportional to the magnitude of the operating limit violation. The present invention will, accordingly, increase plant availability by automatically avoiding conditions which might cause a reactor trip. Further, the present invention enables the operation of the nuclear reactor-turbine generator unit in a manner whereby the unit can supply maximum power within the nuclear steam supply system operating capabilities.

BRIEF DESCRIPTION OF THE DRAWING:

The present invention may be better understood and its numerous objects and advantages will become apparent to those skilled in the art by reference to the accompanying drawing wherein like reference numerals refer to like elements in the several figures and in which.

Figure 1:
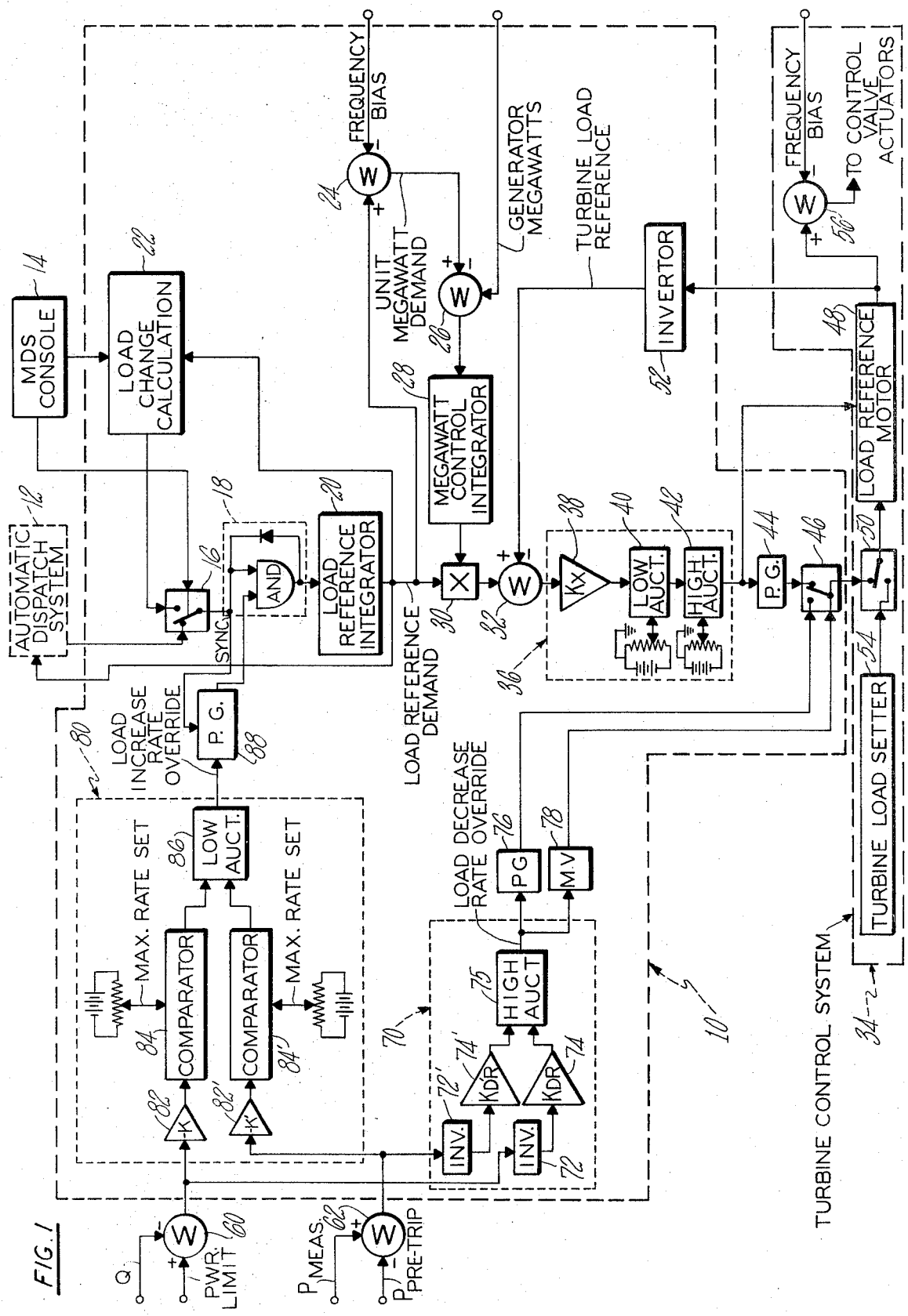
FIG. 1 is an electrical circuit block diagram of a preferred embodiment of a megawatt demand setter in accordance with the present invention.

DESCRIPTION OF THE PREFERRED EMBODIMENT:

With reference to FIG. 1, a megawatt demand setter in accordance with the present invention is indicated generally at 10. Inputs to the megawatt demand setter 10 are provided by an automatic dispatch system 12, typically located at a remote installation, and a megawatt demand setter operator's console 14. Additional inputs are provided from the nuclear steam supply system operating limit supervisory system, in the manner to be described below, and from the turbine and its associated generator. The automatic dispatch system 12 is a state-of-the-art computer based control, which does not comprise part of the present invention, and will not be described herein. The dispatch system 12 will typically provide output signals commensurate with the desired load on each generator unit. These dispatch system output signals will customarily be in the form of pulses indicative of a load change command.

Under normal operating conditions the input pulses to megawatt demand setter 10 from the automatic dispatch system 12, commensurate with a command that the generator unit should either increase or decrease its share of the total grid load, are delivered to a mode transfer switching device 16. In the "automatic" mode, the dispatch system generated signals will be passed, via further series connected gating device 18 which will be described in greater detail below, to a load reference integrator 20. Integrator 20 will totalize the pulses applied thereto and, in the manner known in the art, will provide a direct current load reference demand output signal having a magnitude commensurate with the demand, in megawatts of electrical power, on the generator unit. This load reference demand signal will be fed back to the automatic dispatch system 12 thereby providing, at the load sharing computer, information commensurate with the demand requirements which have been transmitted to the megawatt demand setter 10. The load reference demand signal from integrator 20 is also applied as an input to a load change calculation circuit 22.

The load change calculation circuit 22 comprises a comparator circuit and pulse generator. In the manual control mode the operator may set a desired load and a desired rate of change of load by manipulation of controls on console 14. A direct current signal commensurate with the operator's load selection will be compared with the load reference demand signal from integrator 20 in load change calculation circuit 22. Any error signal resulting from this comparison will be employed, in the manner known in the art, to control the output of a pulse generator which will provide increase or decrease pulses at a rate commensurate with the rate of change setting selected by the operator to the integrator 20 via the mode transfer switch 16. Switch 16 may be an electronic switch or a solenoid operated device controllable directly from console 14 whereby the operator may take command of the unit away from the automatic dispatch system should he desire to do so.

The load reference demand signal from integrator 20 is summed, in a summing circuit 24, with a frequency bias signal. This frequency bias signal is in megawatts and is commensurate with turbine speed error. The means for providing the frequency bias signal are well known and presently available in the art and thus will not be described herein. The frequency bias signal will be added to the load reference demand signal in order to cause, in the manner to be described below, an increase in load and thus in turbine speed if the frequency starts to drop below the desired level and a decrease in load if frequency exceeds the grid reference frequency. The output of the summing circuit 24 is thus a unit megawatt demand signal compensated for generator frequency error. This adjusted unit megawatt demand signal is summed, in a further summing circuit 26, with a signal commensurate with the actual measured power being supplied by the generator. The results of this comparison will be a load error signal which is applied, via a "megawatt control" integrator 28, to a multiplication circuit 30. The load reference demand signal from integrator 20 is also applied to circuit 30. The integrated demand error signal will control the gain of circuit 30 whereby the system functions in the well known integral servo loop mode. Alternatively, circuit 30 may be merely a summing circuit that biases the load rate demand in such a manner as to force the generator megawatts output to equal the desired value.

The output of circuit 30 is summed, in a further summing circuit 32, with a signal commensurate with the actual turbine load reference. This turbine load reference signal is fed back from the turbine control system which is indicated generally in simplified form at 34. The turbine control system will be state-of-the-art hardware supplied by the turbine manufacturer and does not constitute part of the present invention. Summing circuit 32 provides a signal having a magnitude and polarity commensurate with the difference between the actual setting of the turbine load control devices, for example steam inlet valves, and the load the operator or automatic dispatch system wishes the turbine to assume.

Figure 2:
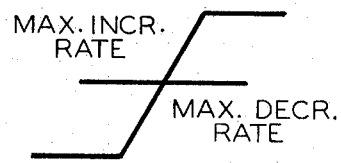
FIG. 2 is a graphical representation of the output signal provided by the power change limiting circuit 36 of the embodiment of FIG. 1.

The output signal from summing circuit 32 is applied to a high-low limiting circuit indicated generally at 36. The output signal provided by circuit 36 is indicated graphically in FIG. 2. The limiting circuit 36 will typically include a linear amplification device 38 and a pair of series connected auctioneering circuits 40 and 42. The amplifier means 38, in response to the signal provided by summing circuit 32, will provide an output signal which varies linearly therewith in both the negative and positive directions. Amplifier means 38 may, accordingly, comprise a commercially available operational amplifier. The output of amplifier means 38 is applied to a "lowest wins" auctioneering circuit 40 wherein it is compared with a steady-state bias signal commensurate with the maximum desired rate of increase of the load on the generator unit. This maximum load increase rate signal will typically be commensurate with a rate of change of load in the region of 5 to 10 percent per minute. The signal selected by auctioneering circuit 40 will be applied to a "highest wins" auctioneering circuit 42 wherein it will be compared with a steady-state bias signal commensurate with the maximum desired rate of reduction of generator unit load under normal operating conditions. The output of auctioneering circuit 42 will, accordingly, be either of the normal maximum rate bias signals except when the output of amplifier means 38 is commensurate with a load change rate in the range between the permissible maximum load increase and normal maximum load decrease rates.

The output of auctioneering circuit 42 is applied to a pulse generator 44 wherein it is employed to modulate the width of the pulses provided about a nominal value; the nominal value being indicative of the condition wherein no change in the setting of the turbines steam supply valves is required. Under normal operating conditions the pulses provided by generator 44 are delivered to a load reference "motor" 48 in the turbine control system 34 via a switch device 46 in demand setter 10 and a mode selector switch 50 in turbine control 34. The selector switch 50 will customarily be in the "remote/automatic" position. The function and control of switch 46 will be described in detail below.

Considering briefly the turbine control system 34, which as noted above does not comprise part of the present invention, the mode selector switch 50 will be operator controlled and will, as noted above, normally be in the "remote/automatic" position wherein load change signals provided by megawatt demand setter 10 will be passed to the load reference "motor" 48. The turbine control system also includes a load setter circuit 54 whereby the operator can manually select a new load and a rate of change of load for the generator unit. Signals provided by turbine load setter 54 are passed to load reference "motor" 48 when switch 50 is in the "manual" position. The load reference "motor" 48 comprises, in its most basic form, a motor driving a precision linear potentiometer. The load reference "motor" 48 also includes control circuitry whereby load demand change input pulses will be demodulated and applied via suitable switching circuitry in such a manner as to cause the motor to operate in either the clockwise or counterclockwise direction. Sign information for the control circuitry in load reference "motor" 48 will be supplied directly from the output of the limiting circuit 36. As will be obvious to those skilled in the art, load reference "motor" 48 performs a memory function with respect to load change commands received by turbine control system 34.

The turbine load reference signal from load reference "motor" 48 is, in the manner described above, fed back to summing circuit 32; an inverter 52 being incorporated in the feedback path so that the turbine load reference signal delivered to summing circuit 32 is of the proper polarity. Additionally, the output signal from load reference "motor" 48 is applied to a further summing circuit 56. The second input to summing circuit 56 is the previously discussed frequency bias signal commensurate with turbine speed error. The frequency bias signal is delivered to summing circuit 56 in the interest of insuring rapid response of the turbine to grid frequency changes during all turbine operating modes. The output of summing circuit 56 will be delivered as the control signal to the steam control valve actuators of the turbine control system to accomplish load control in the manner well known in the art.

The preceding discussion has described the present invention in the normal operating mode. As previously noted, the megawatt demand setter 10 possesses the capability of automatically overriding the automatic dispatch system or operator set load demand in the interest of insuring that the nuclear steam supply system operating limits will not be violated. The megawatt demand setter 10 thus, in the manner to be described below, effectively operates on load change input commands to generate signals which will cause a rate of change of turbine load consistent with the nuclear steam supply system operating conditions. The allowable rate of change of turbine load will thus, in accordance with the invention, be the lower of the normal rate, typically between 5 and 10 percent per minute, or an override rate. The override rates are generated by the system in response to calculated or measured nuclear steam supply system limits; the override load change rates being a function of the nearness of monitored nuclear steam supply system conditions to their individual limits. If any of the actual steam supply system conditions being observed is in violation of its calculated or preset limit, a load decrease rate override signal will be generated. This decrease rate override signal will force a decrease in turbine load at a rate which varies with the magnitude of the "violation". Thus, in addition to the above described functions, the megawatt demand setter 10 assures satisfactory load control by limiting the rate of load increase and, when necessary, decreasing the load. The load changes resulting from control in a manner which observes steam supply system conditions, rather than cause an abrupt load set-back, gradually brings the load to its maximum permissible level.

In performing its safety supervisory function the megawatt demand setter 10 receives input signals from a reactor core operating limit supervisory system which, in response to a plurality of measured parameters, provides reactor core operating limit signals commensurate with such parameters. As will be obvious to those skilled in the art, in accordance with the present invention the nuclear steam supply system parameters of interest are those which will respond to a decrease in turbine power to increase the margin between the parameter and its calculated limit. AS indicated in FIG. 1, the operating limit supervisory inputs to the present invention may, for example, include a signal Q commensurate with the best estimate of measured power.

This measured power signal may be calculated in the manner described in copending application Ser. No. 091,808 entitled "Thermal Margin Protection System"; the output of auctioneering circuit 82 of said copending application being employed in the present invention. The Q signal will be a measure of reactor power as a function of either pressure vessel coolant temperature rise or measured neutron flux. The "best estimate" of power signal will be compared, in a summing circuit 60, with a power limit signal. The power limit signal may, for example, be a constant commensurate with the reactor's licensed power limit. Summing circuit 60 will provide a first signal commensurate with the proximity of the power being produced by the reactor to its limit.

A further operating limit supervisory input signal may be related to the reactor coolant pressure at which departure from nucleate boiling occurs. This pressure signal may, for example, be the pre-trip signal provided by summing circuit 106 of above referenced copending application Ser. No. 091,808. This $P_{PRE-TRIP}$ trip signal is compared in summing circuit 62 with the actual primary coolant pressure as measured at the pressurizer. The output of summing circuit 62, accordingly, is a second signal commensurate with the proximity of a steam supply system operating condition to its limit.

Figure 4:
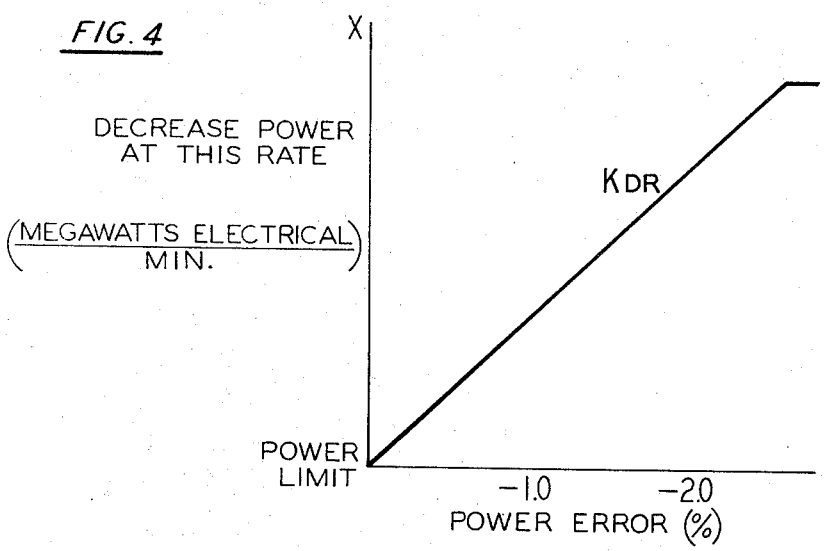
FIG. 4 is a graphical representation of the output signal provided by one of the function generators of the load decrease rate override circuit 70 of the embodiment of FIG. 1.

The output signals provided by summing circuits 60 and 62 are both applied to load decrease rate override control circuit 70 and load increase rate override control circuit 80. In the disclosed embodiment the inputs to control circuit 70 will be of negative polarity when the monitored nuclear steam supply system conditions are in violation of their preset or calculated limits. The inputs to control circuit 70 from summing circuits 60 and 62 are respectively applied to inverters 72 and 72'. Means, for example input diodes, may be employed whereby inverters 72 and 72' are responsive only to negative polarity input signals; these negative polarity signals being inverted and applied respectively to function generators 74 and 74'. Considering function generator 74 for purposes of explanation, this component may be merely an operational amplifier which provides, in response to an input signal, an output waveform as depicted in FIG. 4. It is desired to generate an output signal which will provide corrective action, in the form of a load decrease rate, which varies directly with the magnitude of the excess of the monitored condition with respect to its limit. Function generator 74' will generate a waveform similar to that provided by generator 74; the output of function generator 74' thus being a signal which will command a decrease in power at a rate directly proportional to the magnitude of any pressure limit violation.

The signals provided by function generators 74 and 74' are auctioneered in a "highest wins" circuit 75 whereby a "worst condition" signal is employed as the modulating input to a pulse generator 76. The output pulses from generator 76 will vary in width only in the decreased power direction from the nominal width of the output pulses provided by pulse generator 44. The output pulses from generator 76 are applied to the switching means 46 and, when passed thereby, will operate the load reference "motor" 48 in a direction which causes a reduction in turbine load at a rate commensurate with the magnitude of the output signal selected by auctioneering circuit 75. The output of auctioneering circuit 75 is also applied to control signal generator 78, which may be a monostable multivibrator, which provides a control signal for switching means 46 whenever an output signal appears at the output terminals of auctioneering circuit 75. Accordingly, whenever the steam supply system supervisory circuitry senses a violation of a reactor core operating condition the switching device 46 will be energized by means of circuit 78 so as to pass load decrease rate override pulses from pulse generator 76 to the turbine control system 34. The output of circuit 78 may also be employed to provide "sign" information to the control for load reference motor circuit 48.

Figure 3:
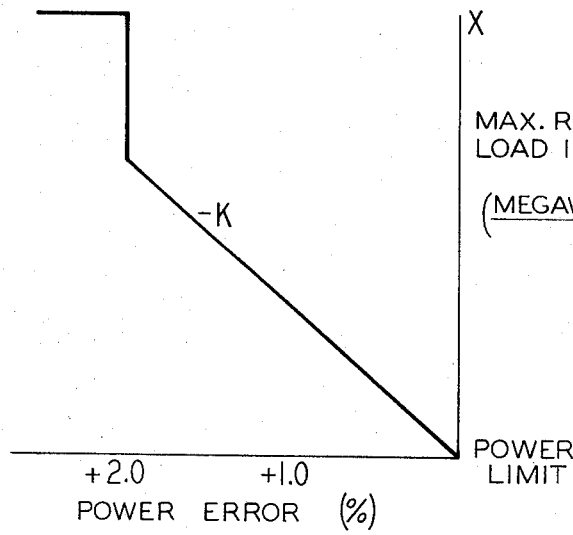
FIG. 3 is a graphical representation of the output signal provided by one of the function generators of the load increase rate override circuit 80 of the embodiment of FIG. 1.

The load increase rate override control circuit 80 includes a pair of input function generators 82 and 82'. The inputs to circuit 80 from summing circuits 60 and 62 will be of positive polarity under normal operating conditions with the monitored or calculated steam supply system parameters of interest being less than their limiting values. Function generators 82 and 82' may be provided with suitable input means, for example diodes, which will prevent the function generators from being responsive to negative polarity input signals from summing circuits 60 and 62. Considering function generator 82 by way of example, this device may comprise an operational amplifier circuit which generates the linearly sloped portion of the curve of FIG. 3; the output of the function generator varying directly with the magnitude of the positive output of summing circuit 60. Function generator 82' will typically differ from function generator 82 only with respect to its gain;; i.e., the desired rate of change of load with respect to remaining pressure margin may differ from the rate of change of load with respect to remaining power margin.

The output signals provided by function generators 82 and 82' are respectively applied as first inputs to comparators 84 and 84'. The comparators 84 and 84' are voltage sensitive switching circuits which select, for passage to an auctioneering circuit 86, either a preset steady-state signal commensurate with the maximum desired rate of load increase or the variable outputs of function generators 82 and 82'. The switching function of comparators 84 and 84' will be voltage sensitive whereby the maximum rate set will be selected until the output of the associated function generator falls below a predetermined level. In the case of comparator 84 this predetermined level would be commensurate with a 2 percent remaining power margin.

The auctioneering circuit 86 will be a "lowest wins" circuit. Accordingly, when any of the monitored parameters or conditions approaches within the preselected percentage of its maximum limit, auctioneering circuit 86 will select a comparator output signal which decreases as the margin between the limiting condition and its maximum permissible level is consumed. This decreasing signal, in the manner to be described below, acts as a load increase rate override. Under normal conditions the output of auctioneering circuit 86 will be the set maximum load increase rate signal.

The output of auctioneering circuit 86 is applied as the modulating input to a pulse generator circuit 88. A synchronizing input for the pulse generator of circuit 88 is provided from the output of mode selector switch 16; the synchronizing pulses emanating either at automatic dispatch system 12 or at load change calculation circuit 22. Pulse generator circuit 88, accordingly, provides output pulses synchronized with load change commands either provided automatically under the control of the dispatch system load sharing computer or produced locally under the supervision of the unit operator. The width of the pulses provided by generator circuit 88 will be commensurate with the magnitude of the signal selected by auctioneering circuit 86. Thus, under normal operating conditions the width of the pulses provided by generator circuit 88 will be comparatively long and commensurate with the maximum load increase rate setting. As a monitored nuclear steam supply system condition or parameter approaches its limit, the width of the pulses provided by generator circuit 88 will be reduced in accordance with a schedule such as the −K rate shown in FIG. 3.

The output pulses from generator circuit 88 are delivered to the gating circuit 18. As shown in FIG. 1, gating circuit 18 may comprise an AND gate and diode connected in parallel. The pulses from circuit 88 are applied as enabling signals to the AND gate in circuit 18. The load change command pulses as selected by switch 16 are applied as the second input to circuit 18. Negative going load decrease command pulses delivered to circuit 18 by switch 16 will be directly passed, by the parallel connected diode in circuit 18, to the load reference integrator 20. Due to the width of the output pulses provided by generator 88 under normal operating conditions, as described above, the AND gate in circuit 18 will normally pass in unaltered form positive load increase command pulses emanating either from dispatch system 12 or load change calculation circuit 22. Whenever the margin remaining between a steam supply system limiting condition under surveillance and its limiting value falls below the preselected percentage, as also discussed above, the width of the load increase command pulses passed by the AND gate in circuit 18 will be reduced and the rate of increase of the output of the load reference integrator 20 will thus vary in accordance with the slope of the rate increase curve established by either of function generators 82 or 82'.

To summarize operation of the embodiment of the invention shown in FIG. 1, automatic dispatch system load increase signals, as limited by the output of pulse generator 88, are passed to the turbine control system. Load decrease signals emanating at the automatic dispatch system will be passed without alteration to the turbine control system except when a nuclear steam supply system operating condition limit has been violated. When such a violation occurs, control will be switched to the load decrease rate override mode until the abnormal condition has been remedied.

Figure 5:
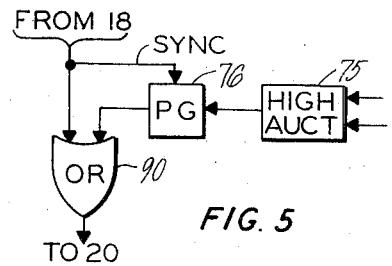
FIG. 5 is a partial block diagram of a second embodiment of the invention.

Referring now to FIG. 5, a modification of the FIG. 1 embodiment wherein both load increase and decrease signals are limited is shown. In the FIG. 5 modification the switch 46 and its control circuit 78 are eliminated and the output signals from pulse generator 76 and gating circuit 18 are applied to an OR gate 90. The FIG. 5 embodiment thus accomplishes load decrease rate override in a similar manner to the load increase rate override control of FIG. 1. The OR gate 90 will pass load decrease pulses but in a manner which establishes a minimum load decrease rate in accordance with a schedule such as the $K_{DR}$ rate shown in FIG. 4. Restated, the OR gate 90, which is connected between the output of gating circuit 18 and the input to load reference integrator 20, will cause the integrator to receive a signal commensurate with the greater of the load decrease rate commands called for by the automatic dispatch system 12 or by the output of auctioneering circuit 75; the load decrease rate thereby being constrained so as to not be less than the output function selected by auctioneering circuit 75. The pulse generator circuit 88 associated with the generation of load increase rate override signals will not provide output signals in response to load decrease command pulses and thus the condition can not occur where OR gate 90 is receiving both load increase and decrease pulses simultaneously. The OR gate 90 includes a parallel connected diode for passing load increase command pulses directly to integrator 20. The pulse generator 90, of course, provides negative going output pulses synchronized with load decrease commands from the automatic dispatch system 12 or load change calculation circuit 22.

It is to be observed that, as employed herein, the terms "parameter" and "condition" have been used interchangeably in referring to quantities pertaining to the nuclear steam supply system which may either be measured directly or calculated from information provided by direct measurements. It is also to be understood that, while the disclosed embodiment of the invention operates on or converts the various input signals to analog form, the invention could be implemented digitally through the use of suitable input and output converters. Accordingly, while a preferred embodiment has been shown and described, various modifications and substitutions may be made thereto without departing from the spirit and scope of the invention.

We claim:

1. An improved method for controlling the load on an electrical power generation unit, the generation unit including a nuclear steam supply system and a steam turbine driving a generator, the method including the steps of:

comparing the desired unit load with actual load to provide a unit load error indication;
  controlling the turbine in accordance with the unit load error indication to null the load error by adjusting the turbine load;
  monitoring a plurality of nuclear steam supply system operating conditions;
  comparing the monitored steam supply system conditions with their permissible limits and providing signals commensurate with differences therebetween;
  providing a load change rate override command whenever the margin between any of the monitored steam supply system operating conditions and its limit is within a preselected range; and
  adjusting the load on the turbine at a rate commensurate with any override command.

2. The method of claim 1 wherein the step of monitoring nuclear steam supply system operating conditions comprises:

receiving signals commensurate with a plurality of nuclear steam supply system operating parameters which respond to a decrease in turbine load to increase the margin between the parameter and its limit.

3. The method of claim 2 wherein the step of providing a load change rate override command includes:

generating a load decrease rate override command whenever any of the monitored steam supply system operating conditions exceeds its limit.

4. The method of claim 2 wherein the step of providing a load change rate override command includes:
    generating a load increase rate override signal whenever any of the monitored conditions approaches within a preselected margin of but does not exceed its limit.

5. The method of claim 3 wherein the step of providing a load change rate override command further includes:
    generating a load increase rate override signal whenever any of the monitored conditions approaches within a preselected margin of but does not exceed its limit.

6. The method of claim 5 wherein the step of adjusting the load on the turbine at a rate commensurate with any override command comprises:
    reducing the load on the turbine at a rate commensurate with the magnitude of the largest of any existing limit excess; and
    reducing the rate of load increase pursuant to nulling a unit load error in accordance with any load increase rate override signal to decrease the permitted rate of load increase as margins between the monitored operating conditions and their limits are consumed.

7. The method of claim 2 wherein the step of controlling the turbine comprises:
    establishing a maximum load increase rate;
    establishing a maximum load decrease rate;
    establishing a variable load change rate between the maximum increase and decrease rates, the variable rate being proportional to load error;
    selecting a load change rate commensurate with the magnitude of the load error whereby the load may be varied at either of the maximum rates or at a variable rate which decreases with the load error; and
    employing the selected load rate to adjust the turbine load.

8. The method of claim 6 wherein the step of generating a load decrease rate override command comprises:

providing a first signal commensurate with the margin between a first nuclear steam supply system limiting condition and its limit;
    providing at least a second signal commensurate with the margin between a second nuclear steam supply system operating condition and its limit;
    selecting the one of said first and second signals commensurate with the greater of any condition limit violation;
    comparing the selected one of the first and second signals with any existing unit load error; and
    selecting for turbine load control the greater load decrease rate as established by either the selected of the first and second signals or by the unit load error.

9. The method of claim 6 wherein the step of generating a load increase rate override command comprises:
    providing a first signal commensurate with the margin between a first nuclear steam supply system limiting condition and its limit whenever the condition approaches within a predetermined proximity to its limit;
    providing at least a second signal commensurate with the margin between a second nuclear steam supply system operating condition and its limit whenever the condition approaches within a predetermined proximity to its limit;
    selecting the one of said first and second signals commensurate with the lesser of the margins remaining;

comparing the selected one of the first and second signals with any existing unit load error; and
    selecting for turbine load control the lesser load increase rate as established by either the selected of the first and second signals or by the unit load error.

10. The method of claim 8 wherein the step of generating a load increase rate override command comprises:
    providing a third signal commensurate with the margin between a first nuclear steam supply system limiting condition and its limit whenever the condition approaches within a predetermined proximity to its limit;
    providing at least a fourth signal commensurate with the margin between a second nuclear steam supply system operating condition and its limit whenever the condition approaches within a predetermined proximity to its limit;
    selecting the one of said third and fourth signals commensurate with the lesser of the margins remaining;

comparing the selected one of the third and fourth signals with any existing unit load error; and
    selecting for turbine load control the lesser load increase rate as established by either the selected of the third and fourth signals or by the unit load error.

* * * * *